United States Patent
Yamaguchi et al.

(10) Patent No.: US 10,934,169 B2
(45) Date of Patent: Mar. 2, 2021

(54) DRAWING DEVICE AND DRAWING METHOD

(71) Applicant: LINTEC CORPORATION, Tokyo (JP)

(72) Inventors: Kazuhisa Yamaguchi, Tokyo (JP); Kei Hatori, Tokyo (JP)

(73) Assignee: LINTEC CORPORATION, Tokyo (JP)

( * ) Notice: Subject to any disclaimer, the term of this patent is extended or adjusted under 35 U.S.C. 154(b) by 289 days.

(21) Appl. No.: 16/067,785

(22) PCT Filed: Dec. 22, 2016

(86) PCT No.: PCT/JP2016/088282
§ 371 (c)(1),
(2) Date: Jul. 2, 2018

(87) PCT Pub. No.: WO2017/119310
PCT Pub. Date: Jul. 13, 2017

(65) Prior Publication Data
US 2019/0010055 A1 Jan. 10, 2019

(30) Foreign Application Priority Data
Jan. 5, 2016 (JP) .............................. JP2016-000680

(51) Int. Cl.
*C01B 32/16* (2017.01)
*C01B 32/158* (2017.01)
(Continued)

(52) U.S. Cl.
CPC .......... *C01B 32/158* (2017.08); *B82B 3/0057* (2013.01); *C01B 32/168* (2017.08);
(Continued)

(58) Field of Classification Search
CPC ...... C01B 32/158; C01B 32/16; C01B 32/168
See application file for complete search history.

(56) References Cited

U.S. PATENT DOCUMENTS

2003/0157332 A1* 8/2003 Udy ........................ C30B 7/005
428/408
2007/0237959 A1* 10/2007 Lemaire ................. B82Y 40/00
428/408
(Continued)

FOREIGN PATENT DOCUMENTS

JP 2010-254567 A 11/2010
JP 2011-136874 A 7/2011
(Continued)

OTHER PUBLICATIONS

JP2014237563 Dec. 2014 Inaguma eng trans (Year: 2014).*
(Continued)

*Primary Examiner* — Joseph A Miller, Jr.
(74) *Attorney, Agent, or Firm* — McDermott Will & Emery LLP

(57) ABSTRACT

A drawing apparatus includes a support for supporting a part of a grown form and a drive unit for causing a relative movement of the support and the grown form to draw an extended form from the grown form. The support performs a double support in which, after a predetermined length of the extended form is drawn, at least one of a predetermined position of the extended form or a part of the grown form continuous with the extended form is again supported.

4 Claims, 2 Drawing Sheets

Figure 1A:
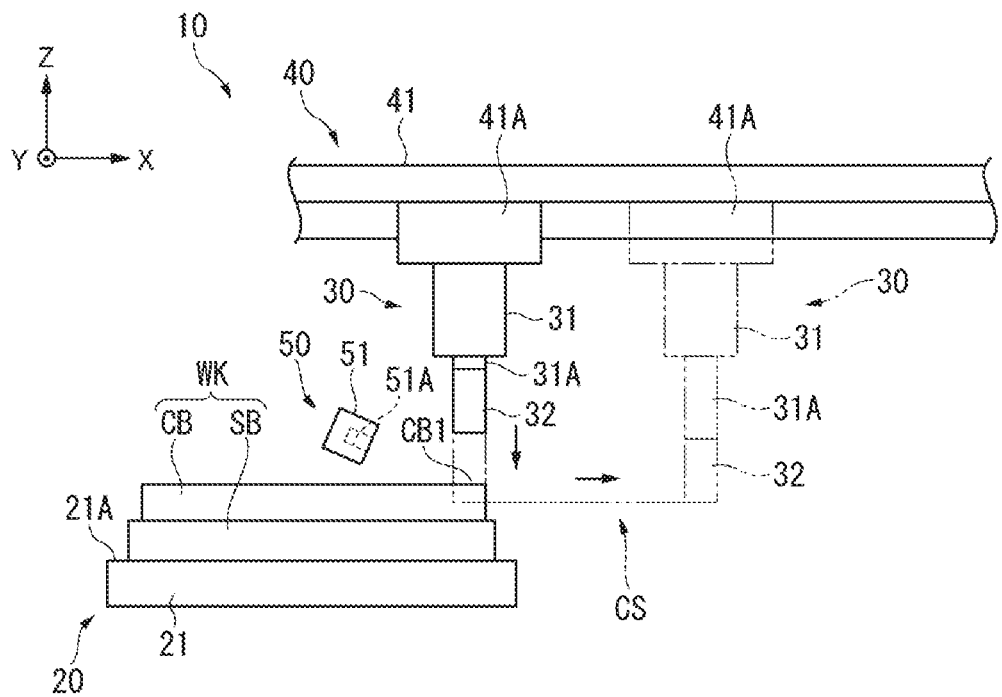

(51) Int. Cl.
*B82B 3/00* (2006.01)
*D02J 1/22* (2006.01)
*C01B 32/168* (2017.01)
*B82Y 30/00* (2011.01)
*B82Y 40/00* (2011.01)

(52) U.S. Cl.
CPC ............... *D02J 1/22* (2013.01); *B82Y 30/00* (2013.01); *B82Y 40/00* (2013.01)

(56) References Cited

U.S. PATENT DOCUMENTS

| | | |
|---|---|---|
| 2008/0018012 A1 | 1/2008 | Lemaire et al. |
| 2010/0270704 A1 | 10/2010 | Feng et al. |
| 2010/0282403 A1* | 11/2010 | Liu .................. B82Y 40/00 156/229 |
| 2011/0117316 A1 | 5/2011 | Lemaire |
| 2015/0291418 A1 | 10/2015 | Wei et al. |
| 2016/0229113 A1* | 8/2016 | Ovalle ................. C01B 32/168 |

FOREIGN PATENT DOCUMENTS

| | | | |
|---|---|---|---|
| JP | 2011-207646 A | | 10/2011 |
| JP | 2014/237563 | * | 12/2014 |
| JP | 2015-203000 A | | 11/2015 |

OTHER PUBLICATIONS

International Preliminary Report on Patentability dated Jul. 10, 2018 in corresponding International Application No. PCT/JP2016/088282, including English translation of Written Opinion of the International Searching Authority (5 pages).

Miao, Menghe, "Yarn spun from carbon nanotube forests: Production, structure, properties and applications," Particuology, Elsevier, Amsterdam, NL, vol. 11, No. 4, Feb. 28, 2013, pp. 378-393, XP028568663.

Search Report issued in corresponding European Application No. 16883809.2, dated Aug. 14, 2019.

Notice of Allowance issued in corresponding Japanese Patent Application No. 2016-000680, dated Sep. 3, 2019, with partial translation.

International Search Report issued in corresponding International Patent Application No. PCT/JP2016/088282, dated Mar. 21, 2017.

\* cited by examiner

DRAWING DEVICE AND DRAWING METHOD

CROSS REFERENCE

This application is the U.S. National Phase under 35 U.S.C. § 371 of International Application No. PCT/JP2016/088282, filed on Dec. 22, 2016, which claims the benefit of Japanese Application No. 2016-000680, filed on Jan. 5, 2016, the entire contents of each are hereby incorporated by reference.

TECHNICAL FIELD

The present invention relates to a drawing apparatus and a method of drawing.

BACKGROUND ART

According to a typically known method, carbon nanotube sheet (extended form) is drawn from a carbon nanotube array (grown form) produced by growing carbon nanotubes (for instance, see Patent Literature 1).

CITATION LIST

Patent Literature(s)

Patent Literature 1 JP 2010-254567 A

SUMMARY OF THE INVENTION

Problem(s) to be Solved by the Invention

Unfortunately, the agglomerated state of the extended form drawn by the typical method as described in Patent Literature 1 is unstable, since the carbon nanotubes are agglomerated merely by an intermolecular force. Thus, the extended form is partially separated to be torn along a drawing direction of the extended form as being drawn, resulting in the poor production efficiency of the extended form. It has been found that such a tear in the extended form is frequently caused at a start-to-draw portion of the extended form.

An object of the invention is to provide a drawing apparatus and a method of drawing capable of preventing a reduction in the production efficiency of an extended form.

Means for Solving the Problem(s)

To achieve the above object, according to an aspect of the invention, a drawing apparatus for drawing an extended form from a grown form produced by growing carbon nanotubes includes: a support configured to support a part of the grown form; and a drive unit configured to cause a relative movement of the support and the grown form to draw the extended form from the grown form, in which the support is configured to perform a double support in which, after a predetermined length of the extended form is drawn, the support again supports at least one of a predetermined position of the extended form or a part of the grown form continuous with the extended form.

In the above aspect, it is preferable that the drawing apparatus further includes a biasing unit configured to bias the extended form when the support performs the double support.

Further, in the above aspect, it is preferable that the support includes two or more pairs of support units arranged in a drawing direction of the grown form, and the support is configured to perform a double support in which, after the extended form is drawn by one of the pairs of support units near a front end in the drawing direction, at least one of the predetermined position of the extended form or the part of the grown form continuous with the extended form is supported again by another one of the pairs of support units near a rear end in the drawing direction.

According to another aspect of the invention, a method of drawing an extended form from a grown form produced by growing carbon nanotubes includes: supporting a part of the grown form with a support; and causing a relative movement of the support and the grown form to draw the extended form from the grown form, in which, in supporting the part of the grown form, a double support is performed, in which, after a predetermined length of the extended form is drawn, at least one of a predetermined position of the extended form or a part of the grown form continuous with the extended form is again supported.

In the above aspects, the double support is performed to again support the extended form at a position beyond a start-to-draw portion, which is easily tearable, in drawing the extended form from the grown form, thus preventing a reduction in the production efficiency of the extended form.

With the use of the biasing unit, the double support can be achieved without the extended form sticking to itself.

Further, with the use of the two or more pairs of support members arranged in the drawing direction of the grown form, the double support can be performed without the necessity of reciprocating the support member in the drawing direction, thus improving the production efficiency of the extended form.

BRIEF DESCRIPTION OF DRAWING(S)

Figure 1B:
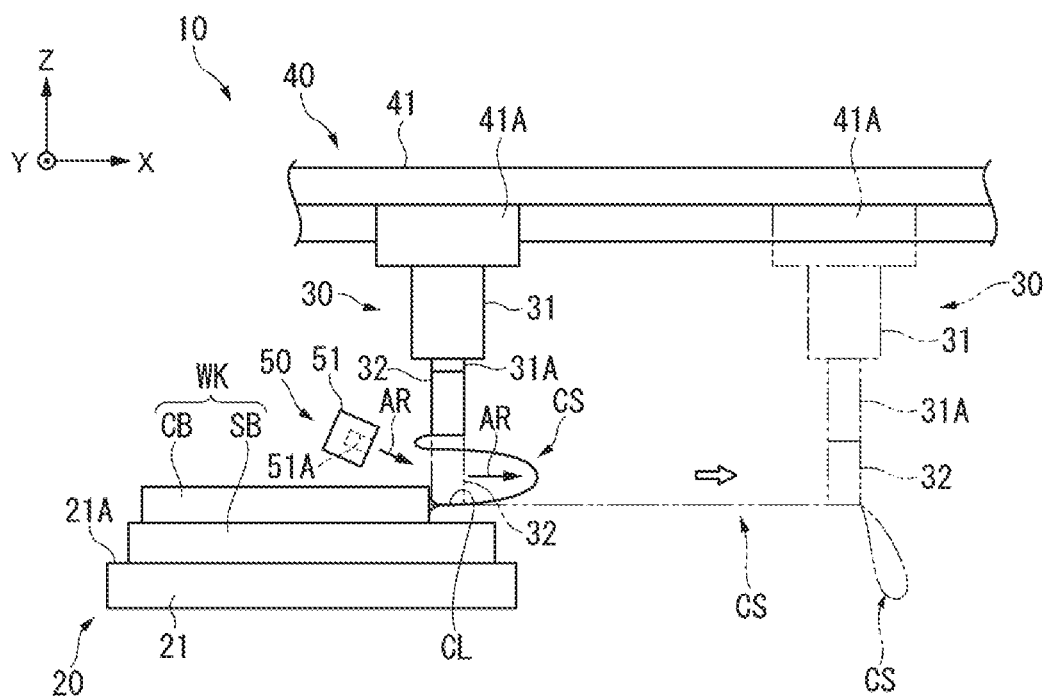
Figure 2A:
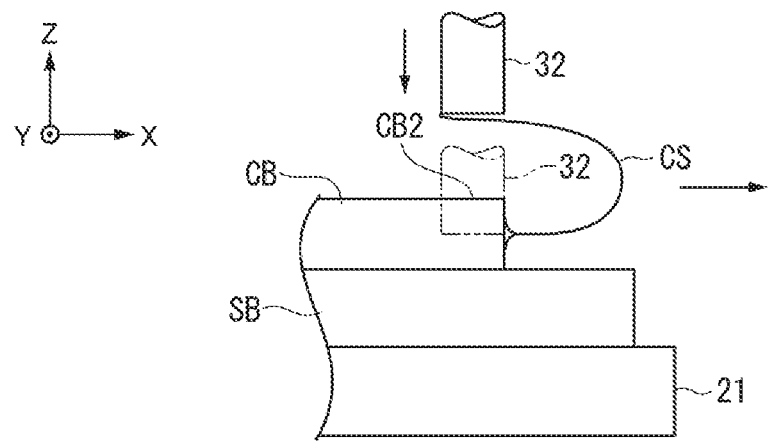
Figure 2B:
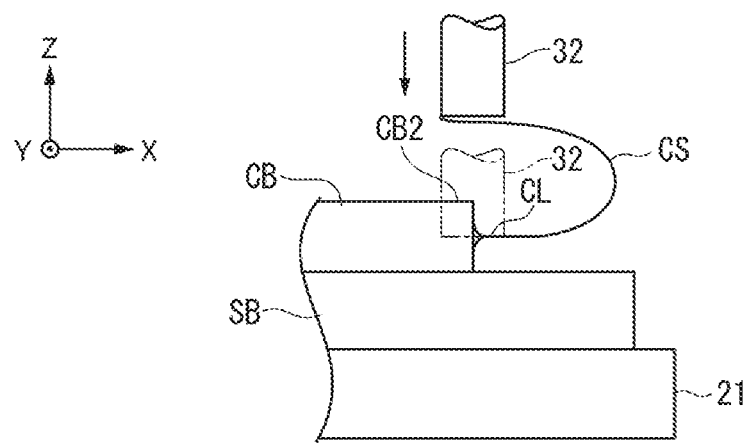
Figure 2C:
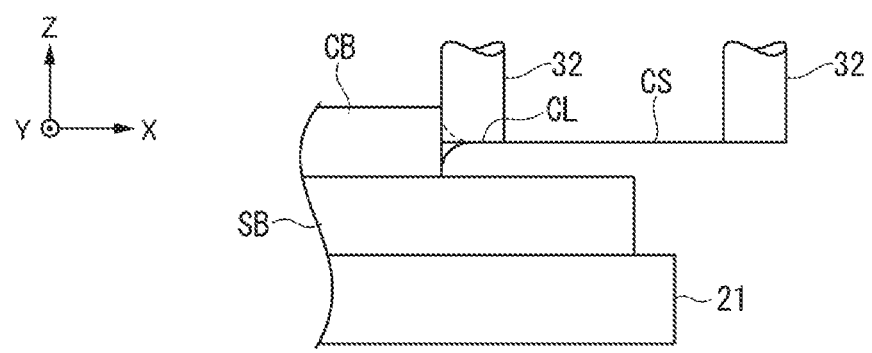

FIG. 1A is a side view showing a drawing apparatus according to an exemplary embodiment of the invention.
FIG. 1B is a side view showing a drawing apparatus according to an exemplary embodiment of the invention.
FIG. 2A illustrates a modification of the invention.
FIG. 2B illustrates the modification of the invention.
FIG. 2C illustrates the modification of the invention.

DESCRIPTION OF EMBODIMENT(S)

An exemplary embodiment of the invention will be described below with reference to the attached drawings.

X-axis, Y-axis and Z-axis according to the exemplary embodiment are orthogonal to one another. The X-axis and the Y-axis are defined within a predetermined plane and the Z-axis is orthogonal to the predetermined plane. Further, the exemplary embodiment is basically described as viewed from a near side in FIG. 1 in parallel with the Y-axis. Specifically, directions referred to in the description include "top" meaning an arrow direction along the Z-axis and "down" meaning the direction opposite thereto, "right" meaning an arrow direction along the X-axis and "left" meaning the direction opposite thereto, and "front" meaning a direction toward the near side in FIG. 1 parallel with the Y-axis and "rear" meaning the direction opposite thereto.

Referring to FIGS. 1A and 1B, a drawing apparatus 10, which is configured to draw an extended form, i.e., a belt-shaped carbon nanotube sheet CS (occasionally simply referred to as "sheet CS" hereinbelow), from a grown form CB produced by growing carbon nanotubes, includes a holder 20 configured to hold the grown form CB, a support 30 configured to support a right end CB1 (a part of the grown form CB), a drive unit 40 configured to cause a relative movement of the support 30 and the grown form CB, and a biasing unit 50 configured to bias the sheet CS. It should be noted that the grown form CB, which is produced by growing the carbon nanotubes upward from a first surface of a substrate SB, and the substrate SB, which supports the grown form CB, form an integrated workpiece WK.

The holder 20 includes a table 21 having a holding surface 21A connected to a decompressor (not shown) such as a decompression pump and a vacuum ejector.

The support 30 includes a linear movement motor 31 (drive device) and a support member 32 supported by an output shaft 31A of the linear movement motor 31 and extending in a width direction of the grown form CB orthogonal to a drawing direction of the sheet CS. The support 30 is configured to be capable of double support, i.e., again supporting the sheet CS at a left end CL (predetermined position) thereof after a predetermined length of the sheet CS is drawn.

The drive unit 40 includes a linear motor 41 (drive device) with a slider 41A, which supports the linear movement motor 31.

The biasing unit 50 includes a blowing nozzle 51 with a blowing hole 51A that is connected to a gas feeder (not shown) such as a pressurizing pump and a turbine.

Description will be made on a process of drawing the sheet CS from the grown form CB using the drawing apparatus 10.

Initially, as shown in FIG. 1A, an operator inputs a signal for starting an automatic operation to the drawing apparatus 10, in which the components are set at respective initial positions shown by solid lines, using an input unit such as an operation panel and a personal computer (not shown). Further, the operator or a transport unit (not shown) such as a multijoint robot and a belt conveyor mounts the integrated workpiece WK at a predetermined position on the holding surface 21A. After the holder 20 drives the decompressor (not shown) so that the integrated workpiece WK is sucked to be held on the holding surface 21A, the drive unit 40 drives the linear motor 41 to place the support member 32 immediately above the right end CB1 of the grown form CB. Subsequently, the support 30 drives the linear movement motor 31 so that the support member 32 is moved downward to press the right end CB1 of the grown form CB as shown by chain double-dashed lines at the left in FIG. 1A. The grown form CB thus adheres to a lower end of the support member 32 due to a viscosity thereof.

Subsequently, the drive unit 40 drives the linear motor 41 to move the support member 32 rightward by a predetermined distance as shown by chain double-dashed lines at the right in FIG. 1A and then stops driving the linear motor 41, thus drawing the predetermined length of the sheet CS from the grown form CB. The thus-obtained sheet CS is made of carbon nanotubes, which are agglomerated by an intermolecular force and aligned along the drawing direction into the shape of sheet. The sheet CS sometimes has a tear at a start-to-draw portion (a portion drawn by the support member 32 at the beginning) along the drawing direction of the sheet CS. Such a phenomenon is supposed to result from an adhesive force between the support member 32 and the grown form CB (carbon nanotubes) being weak at the beginning. Accordingly, the support 30 and the drive unit 40 drive the linear movement motor 31 and the linear motor 41, respectively to perform the double support as shown in solid lines in FIG. 1B. Specifically, after the support member 32 is temporarily returned to the initial position, the support member 32 is moved downward to again press the sheet CS at the left end CL thereof. At this time, the biasing unit 50, for instance, drives the gas feeder (not shown) to prevent the folded sheet CS from sticking to itself. Subsequently, the drive unit 40 drives the linear motor 41 to move the support member 32 rightward to again draw the sheet CS as shown by chain double-dashed lines at the right in FIG. 1B.

When an end of the sheet CS in the drawing direction reaches a receiver (not shown) such as a take-up device for taking up the sheets CS and a cutter for cutting the sheets CS, the support 30 drives the linear movement motor 31 so that the sheets CS is transported to the receiver by the support member 32. Each of the units then drives the corresponding drive device(s) to return the components to the respective initial positions and the above operations are repeated.

In the exemplary embodiment, the double support is performed to again support the sheet CS at a position beyond the start-to-draw portion, which is easily tearable, in drawing the sheet CS from the grown form CB, thus preventing a reduction in the production efficiency of the sheet CS.

Though the best arrangement, process and the like for implementing the invention are disclosed as described above, the scope of the invention is not limited thereto. In other words, while the invention has been specifically explained and illustrated mainly in relation to a particular embodiment, a person skilled in the art could make various modifications in terms of shape, material, quantity or other particulars to the above described embodiment without deviating from the technical idea or any object of the invention. The description limiting the shapes and the materials disclosed above is intended to be illustrative for easier understanding and not to limit the invention. Hence, the invention includes the description using a name of component without a part of or all of the limitation on the shape and the material, etc.

In some exemplary embodiments, the holder 20 holds the integrated workpiece WK using a chuck unit such as a mechanical chuck and chuck cylinder, a mechanism using Coulomb's force, adhesive, pressure-sensitive adhesive, magnetic force or Bernoulli adsorption, or a drive device, or does not hold the integrated workpiece WK.

In some exemplary embodiments, the holder 20 directly holds the grown form CB at the holding surface 21A.

When another device is used to hold the grown form CB, the holder 20 is not necessarily provided.

In some exemplary embodiments, the support 30 performs the double support at a new right end CB2 (a part of the grown form CB continuous with the sheet CS) as shown in FIG. 2A or at a position including both the left end CL of the sheet CS and the new right end CB2 of the grown form CB continuous with the sheet CS as shown in FIG. 2B.

In some exemplary embodiments, the support 30 supports the grown form CB using a chuck unit such as a mechanical chuck and chuck cylinder, a mechanism using Coulomb's force, adhesive, pressure-sensitive adhesive or Bernoulli adsorption, or a drive device.

In some exemplary embodiments, to allow the grown form CB to be supported by the support member 32 of the support 30, the integrated workpiece WK is vertically moved instead of vertically moving the support member 32, or both the support member 32 and the integrated workpiece WK are vertically moved.

In some exemplary embodiments, the support 30 includes two or more pairs of support members 32 (shown in FIG. 2C) and linear movement motors 31, which are arranged in a right-left direction. After the right support member 32 draws the sheet CS, the left support member 32 further draws the sheet CS by supporting at least one of the left end CL of the sheet CS or the right end CB2.

In some exemplary embodiments, the support 30 supports the sheet CS at a portion downstream of the left end CL in the drawing direction or supports the entirety of the drawn sheet CS for the double support.

In some exemplary embodiments, the support 30 performs the double support for two or more times.

In some exemplary embodiments, the support member 32 is made of, for instance, a round bar, a blade material, rubber, resin, or sponge.

In some exemplary embodiments, the drive unit 40 moves the integrated workpiece WK instead of moving the support 30 or moves both the support 30 and the integrated workpiece WK.

In some exemplary embodiments, the drive unit 40 moves the support 30 diagonally upward right or diagonally downward right.

In some exemplary embodiments, the biasing unit 50 blows, for instance, air, elemental gas or mixed gas.

In some exemplary embodiments, the biasing unit 50 biases the sheet CS by suction or, alternatively, the biasing unit 50 includes a biasing member, such as round bar, blade material, rubber, resin, sponge, and drive device, instead of or in combination with the blowing nozzle 51, the biasing member being brought into contact with the sheet CS to bias the sheet CS. Such a contact biasing member is optionally subjected to an unsticking treatment with, for instance, a fluorine resin or a silicone resin so that the sheet CS is unlikely to stick to the biasing member.

In some exemplary embodiments, the biasing unit 50 biases the sheet CS in a thickness direction of the grown form CB.

In some exemplary embodiments, the extended form is a string-shaped agglomerated body of carbon nanotubes.

In some exemplary embodiments, a detecting unit, such as an imaging device (e.g., camera) and an optical sensor, is provided to detect a tear in the sheet CS drawn from the grown form CB so that the double support is performed when the detecting unit detects a tear.

The invention is by no means limited to the above units and processes as long as the above operations, functions or processes of the units and processes are achievable, still less to the above merely exemplary arrangements and processes described in the exemplary embodiment. For instance, any drive unit within the technical scope at the time of filing the application is usable as long as the drive unit is capable of causing a relative movement of the support and the grown form and drawing the extended form from the grown form (explanation for other units and processes will be omitted).

For instance, the drive device in the above exemplary embodiment is provided by: motorized equipment such as a rotary motor, linear movement motor, linear motor, single-spindle robot and multi-joint robot; an actuator such as an air cylinder, hydraulic cylinder, rodless cylinder and rotary cylinder; or a direct or indirect combination thereof (some of the drive devices overlap with the exemplified drive devices in the exemplary embodiment).

EXPLANATION OF CODE(S)

10 drawing apparatus
30 support
32 support member
33 biasing unit
40 drive unit
50 biasing unit
CB grown form
CL left end (predetermined position)
CS carbon nanotube sheet (extended form)

The invention claimed is:

1. A method for using a drawing apparatus for drawing an extended form from a grown form produced by growing carbon nanotubes, the drawing apparatus comprising: a support member configured to support a part of the grown form; and a drive unit configured to cause a relative movement of the support member and the grown form to draw the extended form from the grown form, the method comprising:
  moving one of the support member and the grown form closer to another of the support member and the grown form to support the part of the grown form with the support member;
  moving the one of the support member and the grown form away from the another of the support member and the grown form to draw the extended form from the grown form, the support member supporting a first position of the drawn extended form, the first position of the drawn extended form corresponding to the part of the grown form; and
  after drawing the extended form, while supporting the first position of the drawn extended form with the support member, (1) moving again the one of the support member and the grown form closer to the another of the support member and the grown form, and (2) then supporting at least one of a second position of the drawn extended form or a part of the grown form continuous with the drawn extended form.

2. The method according to claim 1, further comprising preventing a part of the drawn extended form sticking to another part of the drawn extended form when the one of the support member and the grown form is again moved closer to the another of the support member and the grown form.

3. A method of drawing an extended form from a grown form produced by growing carbon nanotubes, the method comprising:
  moving one of a support member and the grown form closer to another of the support member and the grown form to support a part of the grown form with the support member;
  moving the one of the support member and the grown form away from the another of the support member and the grown form to draw the extended form from the grown form, the support member supporting a first position of the drawn extended form, the first position of the drawn extended form corresponding to the part of the grown form; and
  after drawing the extended form, while supporting the first position of the drawn extended form with the support member, (1) moving again the one of the support member and the grown form closer to the another of the support member and the grown form, and (2) then supporting at least one of a second position of the drawn extended form or a part of the grown form continuous with the drawn extended form.

4. A method of drawing an extended form from a grown form produced by growing carbon nanotubes, the method comprising:
  moving one of a first support member and the grown form closer to another of the first support member and the grown form to support a part of the grown form with the first support member;

moving the one of the first support member and the grown form away from the another of the first support member and the grown form to draw the extended form from the grown form, the first support member supporting a first position of the drawn extended form, the first position of the drawn extended form corresponding to the part of the grown form;

after drawing the extended form, while supporting the first position of the drawn extended form with the first support member, supporting with a second support member at least one of a second position of the drawn extended form or a part of the grown form continuous with the drawn extended form; and moving one of (1) the first and second support members and (2) the grown form away from another of (1) the first and second support members and (2) the grown form to redraw the extended form from the grown form.

* * * * *